US005645886A

United States Patent [19]

Schueler, II et al.

[11] Patent Number: 5,645,886
[45] Date of Patent: Jul. 8, 1997

[54] METHOD AND SYSTEM FOR SEALING A RADIOFREQUENCY SIGNAL ABSORBING COATING

[75] Inventors: John T. Schueler, II, Irving; Stanley L. Ramirez, Fort Worth, both of Tex.

[73] Assignee: Lockheed Fort Worth Company, Fort Worth, Tex.

[21] Appl. No.: 522,826

[22] Filed: Sep. 1, 1995

Related U.S. Application Data

[63] Continuation of Ser. No. 184,228, Jan. 19, 1994, abandoned.

[51] Int. Cl.$^{6}$ .............................................. B32B 35/00

[52] U.S. Cl. ....................... 427/140; 29/402.18; 342/1; 342/2; 427/142; 427/282; 427/356; 523/137

[58] Field of Search ......................... 29/402.18; 342/1, 342/2; 427/140, 142, 356; 523/137; 422/282

[56] References Cited

U.S. PATENT DOCUMENTS

| | | | |
|---|---|---|---|
| 4,003,840 | 1/1977 | Ishino et al. | 342/1 X |
| 5,103,231 | 4/1992 | Niioka | 342/1 |
| 5,179,381 | 1/1993 | Hatakeyama | 342/1 |
| 5,323,160 | 6/1994 | Kim et al. | 342/1 |

*Primary Examiner*—Michael Lusignan
*Attorney, Agent, or Firm*—Baker & Botts, L.L.P.

[57] ABSTRACT

A system for sealing an exposed area of a surface coated with a radiofrequency signal absorbing coating includes a heat-responsive compound that transforms from a solid state to viscous melted state at temperatures above a predetermined temperature and that returns to a solid state after cooling to temperatures below the predetermined temperature. The heat-responsive compound has a radiofrequency absorbing material for absorbing radiofrequency signals at approximately equal frequency to those that the radiofrequency signal absorbing coating absorbs. An applicator applies the heat-responsive compound in the viscous melted state to cover the exposed areas. An absorptive tape conceals any gap or fastener associated with the exposed area and absorbs radiofrequency signals having approximately equal frequencies to those of the radiofrequency signal absorptive coatings. The heat responsive coating also may be smoothly formed over the absorptive tape to make a continuous, smooth surface with the original radiofrequency signal absorbing coating.

20 Claims, 4 Drawing Sheets

METHOD AND SYSTEM FOR SEALING A RADIOFREQUENCY SIGNAL ABSORBING COATING

CROSS REFERENCE TO RELATED APPLICATIONS

This application is a continuation of U.S. application Ser. No. 08/184,228 filed Jan. 19, 1994, entitled "Method and System for Sealing a Radiofrequency Signal Absorbing Coating" by Christopher L. Harris, now abandoned.

TECHNICAL FIELD OF THE INVENTION

The present invention relates in general to the field of radiofrequency signal absorptive coatings and, more particularly, to an improved method and repair kit for sealing radiofrequency signal absorbing coatings that cover structural components of vehicles such as military aircraft and other platforms, as well as similar coatings that cover stationary structures.

BACKGROUND OF THE INVENTION

Many military aircraft and other vehicles include on their outer structures radiofrequency signal absorptive coatings. These coatings provide to the vehicle the attractive feature of being less detectable by active radar systems that detect the presence of the vehicle by sending a radiofrequency signal in the direction of the vehicle and detecting the signal's reflection by the vehicle's outer reflective surface. The radiofrequency signal absorptive coatings deter detection by essentially forming an attenuative envelope that surrounds and hides the vehicle. These coatings are typically thin, on the order of approximately 0.015 inches to 0.040 inches thick, and often contain 40 to 45 volume percent carbonyl iron powder (CIP). During maintenance or in the event of damage to the coating, the envelope that the absorptive coating forms can have an opening. Such an opening exposes the underlying reflective surface of the vehicle. To restore the integrity of the absorptive coating, it is necessary to seal the opening by reworking and repairing the radiofrequency signal absorptive coating.

Rework and repair of attenuative coatings in the field has been addressed in several ways for the various types of coatings that military aircraft and other vehicles presently use. Generally, these materials consist of multi-component materials that are sprayed or bonded to the affected region. These materials exhibit significant reliability, maintainability, and sustainability limitations. One problem is that there are often significant cure times that must pass before placing the affected vehicle back in service. For example, existing repair compounds use epoxies or urethanes that require over two hours to cure. In a tactical situation, however, it is often not feasible to prohibit the aircraft from flying following a repair for more than two hours. As a result, openings in these coatings will go unrepaired on aircraft that cannot land and wait the necessary time for the epoxy or urethane to cure. Failing to repair the coating subjects the aircraft to detection and makes it more vulnerable. The two hour cure time of known repair techniques, therefore, can significantly affect the operational capability of the vehicle itself.

Because of the above reasons, a key factor in governing the ultimate utility of an absorptive coating repair and rework system is the cure time of the repair compound. These factors, however, must be balanced with the pursuit of a material that field personnel can easily apply to restore the coating to its original performance level. Known repair compounds, for example, are messy, toxic, and often require a substantial degree of finishing or sanding to restore the absorptive coating to its original effectiveness. A further limitation of existing repair compounds is that they do not easily form into or fill gaps or small openings in the associated vehicle surface. If the system is not easy to apply, field personnel will in many cases elect not to use it rather than suffer the unacceptable down time and frustration that working with it presents. This also degrades the overall performance of the absorptive coating.

Consequently, there is a need for a method and system for repairing and reworking attenuative coatings on vehicles such as a military aircraft.

There is a further need for a system for sealing a radiofrequency signal absorbing coating that is easy to apply with a minimal degree of finishing after application.

There is also a need for a method and system for sealing attenuative coating that possess attractive characteristics such as desirable gap filling properties, high and low temperature performance, and environmental suitability.

SUMMARY OF THE INVENTION

The present invention, therefore, provides a method and repair kit for sealing a radiofrequency signal absorptive coating that substantially eliminates or reduces disadvantages and problems associated with previously developed methods and repair kit for sealing radiofrequency signal absorptive coatings.

One aspect of the invention includes a repair kit for sealing an exposed area of a surface coating with a radiofrequency signal absorptive coating. The repair kit includes a heat-responsive compound that transforms from a solid state to a viscous melted state at temperatures above a selected temperature. The heat-responsive compound returns to a solid state after cooling to temperatures below the selected temperature. The heat-responsive compound includes a radiofrequency absorbing material for absorbing radiofrequency signals having frequencies similar to the frequencies of the radiofrequency signals that the original coating absorbs. An applicator applies the heat-responsive compound in the viscous melted state to cover the exposed area. The applicator includes an applicator tip that applies the melted heat-responsive compound in a smooth, controlled manner. An absorptive tape or film conceals any gap or fasteners associated with the exposed area. The absorptive tape has the ability to absorb radiofrequency signals of approximately equal frequency to those absorbed by the radiofrequency signal absorptive coating. The heat-responsive compound also smoothes over any gaps that may exist between the tape and the original coating.

A technical advantage of the present invention is that the heat-responsive compound or hot melt achieves an essentially instant cure after being applied to the coating. In one embodiment, the heat-responsive material cures by cooling below the selected temperature in a time of less than approximately one minute.

Another technical advantage of the present invention is that the applicator device applies the heat-responsive compound more completely in gaps or recesses of the structural surface than is possible with using conventional application methods without extensive secondary finishing of the reworked and repaired area.

Yet another technical advantage of the present invention is that it is possible to apply the absorptive film to hide gaps and fasteners more effectively than with known techniques.

This maintains the integrity of the radiofrequency signal absorptive coating. By sealing the edges of the tape with heat-responsive compound, a continuous seal results that provides the desired degree of radiofrequency signal absorption.

BRIEF DESCRIPTION OF THE DRAWINGS

For more complete understanding of the present invention and advantages thereof, reference is now made to the following detailed description which is to be taken in conjunction with the accompanying FIGURES where like reference numerals indicate like features, and wherein.

DETAILED DESCRIPTION OF THE INVENTION

Various embodiments of the present invention are illustrated herein by the FIGURES, like numerals being used to refer to like and corresponding parts of the various drawings.

Figure 2:
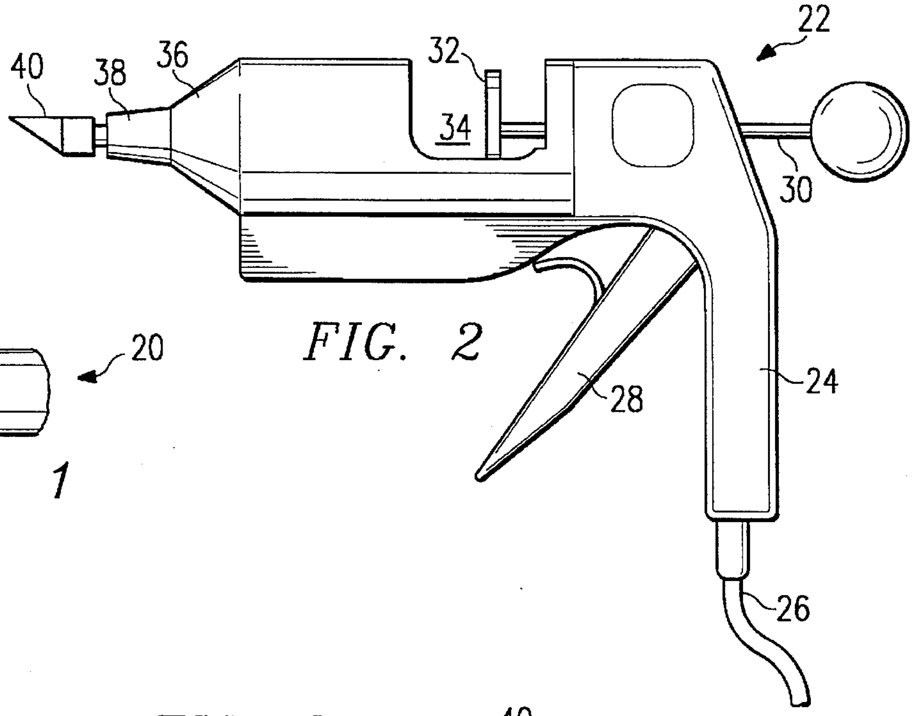
FIG. 2 illustrates the applicator of the present embodiment.
Figure 1:
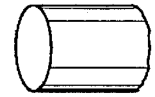
FIG. 1 shows an exemplary form of the heat-responsive compound that the present embodiment provides.

FIG. 1 illustrates heat-responsive compound 20 in the form of a cylindrical rod or stick that fits within applicator 22 of FIG. 2. Applicator 22 includes handle 24 that receives electrical cord 26 and to which trigger 28 pivotally engages. Trigger 28 controls the movement of shaft 30 to direct push plate 32 within barrel 34. Barrel 34 receives compound 20 and, using a heating element within cartridge 36, heats compound 20 to produce a viscous molten material. When shaft 30 moves push plate 32 in the direction of barrel portion 38, compound 20 extrudes through barrel portion 38 and applicator tip 40. Applicator tip 40 applies the melted compound 20 to the surface for repairing and reworking the open area in an absorptive coating.

The handling requirements of heat-responsive compound 20 are that it be suitable for use on the exterior surfaces of aircraft to fill and seal gaps, cracks, etc., in radiofrequency signal absorbing coatings. These coatings are generally made of elastomeric compounds and, therefore, have certain temperature limitations. For example, in the present embodiment, compound 20 is suitable for use in temperatures ranging from −65° F. to +250° F. As shown above, the solid form of compound 20 is preferably of a size that comfortably fits within barrel 34 of applicator 22. One embodiment, for example, uses a stick measuring approximately 1.70 inches in diameter that is approximately 2 inches long. Such a stick is suitable for the Hysol Model 3000 or equivalent device that may serve as applicator 22.

Compound 20 includes a carbonyl iron powder (CIP) filler suspended in a thermoplastic resin in the present embodiment. Other embodiments of the invention may include nickel, silver, pure iron, ferrites or other fillers that possess desirable electromagnetic performance. The fillers may be solid or may be a hybrid structure on a microscopic scale such as plastic, glass or ceramic microballoons, microballs, flakes, or fibers that are coated with a desired metallic material. The thermoplastic resin of the present embodiment may be a polyamide compound or may be a polypropylene or other substance that possesses the desired physical properties as described below.

Compound 20 also provides a matrix for attenuative fillers that in a single component has an extremely short cure time. For example, the present embodiment has a cure time of less than 1 minute. Compound 20 is, in essence, a resin repair kit that includes fillers that were mixed with the resin while it was hot. This makes the resin ideal for wetting the filler particles and making them part of the resin repair kit. Compound 20 is designed to have enhanced adhesion, maximum filler content, and environmental resistance. There may be, however, other available industrial hot melt resins that are suitable in terms of melt viscosity, service temperature, and environmental stability for purposes of the present embodiment. Chemical agents may also be added to the resin repair kit to modify properties such as adhesion, maximum filler content, and the electrical resistance of the resulting covering.

Compound 20 lends itself well to the treatment of small areas of damage to attenuative coatings, treatment of access panel gaps, mismatches, etc. or any small areas treated for surface feature attenuation and is more readily removed for subsequent access than paste or putty material. Compound 20, therefore, may be reapplied in a matter of minutes.

The material and mechanical properties of compound 20 are easily defined by reference to established testing standards for polymeric compounds. For example, the American Society for Testing and Materials (ASTM) standards define certain material requirements and the Military Specifications (described and referred by the abbreviation "MIL") prescribe certain requirements for items having military use. These are national standards that comply with military requirements for military aircraft on which the present embodiment may be used. Moreover, compound 20 possesses properties that may be evaluated by use of the following ASTM test requirements:

| | |
|---|---|
| ASTM D522 | Test method for elongation of attached organic coatings with conical mandrell apparatus. |
| ASTM D792 | Test method for specific gravity (relative density) and density of plastics by displacement. |
| ASTM 1002 | Test method for strength properties of adhesives and shear tension loading (metal-to-metal). |
| ASTM D1525 | Test method for vicat softening temperature for plastics. |
| ASTM D2240 | Test method for rubber property durometer hardness. |
| ASTM G85 | Practice for modified salt spray (fog) testing. |

These are satisfied by the present embodiment as herein described.

The coating flexibility and corrosion inhibiting properties of the compound include those defined by MIL-P-23377. Additionally, the primer coating, which is an epoxy polyamide chemical and solvent, possess resistant properties of heat-responsive compound 20 that comply with MIL-P-23377. These requirements are herein incorporated by reference.

Material requirements that may define the characteristics of compound 20 include that the material have a minimum single overlap shear strength of 100 psi when tested in accordance with ASTM D1002. Materials should show no signs of softening, blistering, or other effects indicative of chemical deterioration when tested in accordance with the chemical resistance requirements of ASTM D1002. The solid form of compound 20 in the present embodiment has a measurable Shore A hardness of 60±5 when tested according to ASTM D2240. In addition, compound 20 demonstrates a vicat softening temperature of no less than 350° F. when tested in accordance with ASTM D1525. The specific gravity of the solid form of compound 20 ranges between 3.6 and 3.8 when tested according to ASTM D792. Compound 20 shows no sign of cracking or loss of adhesion when tested in accordance with ASTM D552 at room temperature and at −65° F. Moreover, using a conical mandrel bend test apparatus, as described in ASTM D522, at room temperature and at −65° F., compound 20 does not show signs of loss of adhesion or cracking following deformation. Compound 20 meets all of these requirements for a minimum of one year from the date of receipt when stored dry at a 120° F. or lower. Compound 20, in addition, can be formulated to meet specific electromagnetic performance requirements set forth by a given weapon system specification. All of the above requirements and specifications are herein expressly incorporated by reference.

Figure 3A:
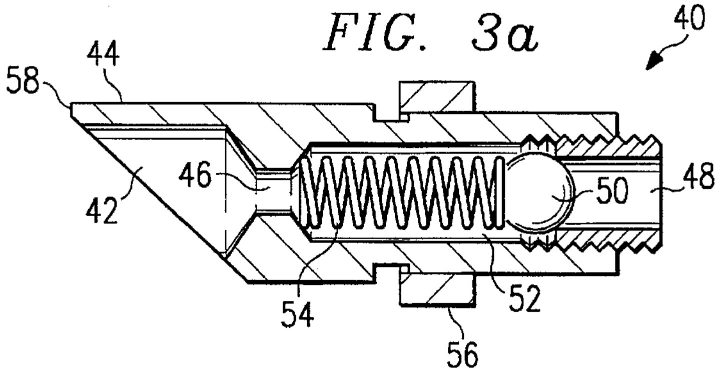
FIGS. 3*a*, 3*b* and 3*c* provide in more detail various views of the applicator tip of the present embodiment.
Figure 3C:
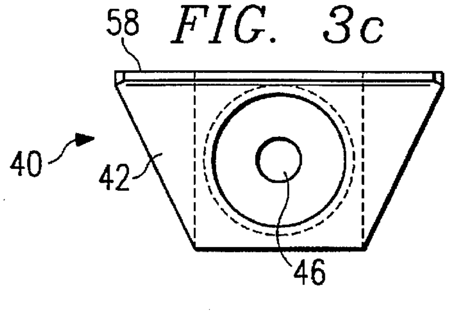
Figure 3B:
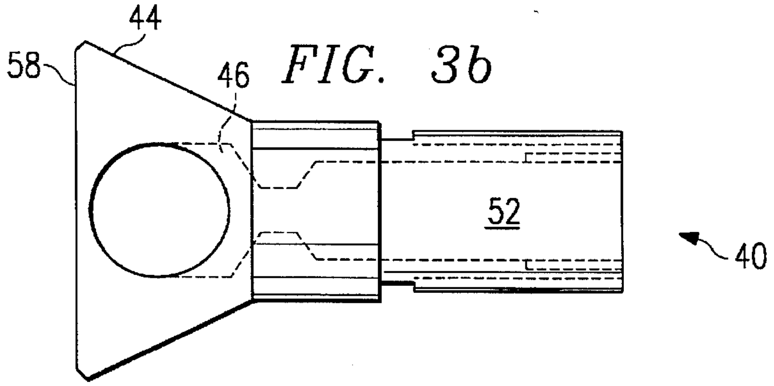

FIGS. 3*a*–3*c* provide, respectively, a cut-away sideview, a top cross-sectional view, and an end view of applicator tip 40. In the present embodiment, applicator tip 40 is a mechanical copper part. Other materials having the desired flexibility and temperature performance may also be used to form applicator tip 40. Referring to FIG. 3*a*, the side cut-away view shows that applicator tip 40 includes applicator volume 42 within end piece 44. Applicator volume 42 receives through orifice 46 the molten form of compound 20 from chamber 48. Ball valve 50 separates chamber 52 from retainer barrel 48. Spring 54 provides a positive force on ball valve 50 in the direction of retainer barrel 48. Nut 56 locks applicator device tip 40 on smaller barrel portion 38 of applicator device 22. End piece 44 provides straight elongated edge 58 that smoothes the viscous molten compound 20 over the surface. This smoothes the motion compound 20 over the exposed area. FIGS. 3*b* and 3*c* provide additional views of applicator tip 40.

Figure 4A:
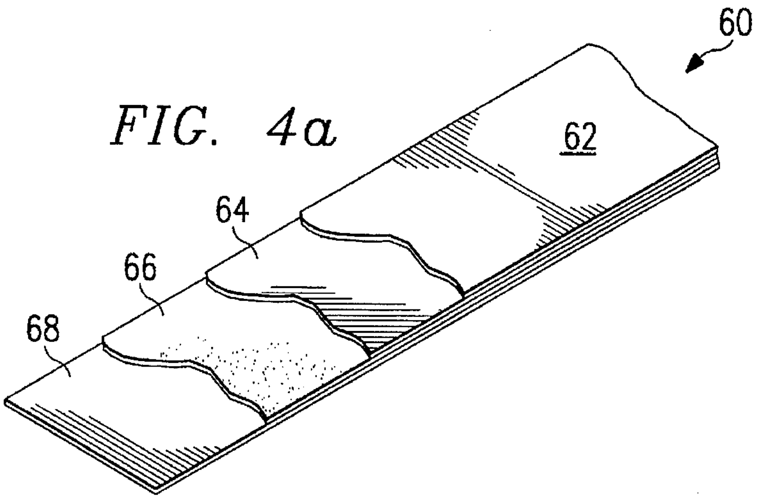
FIGS. 4*a* and 4*b* illustrate various embodiments of the absorptive tape of the present invention.
Figure 4B:
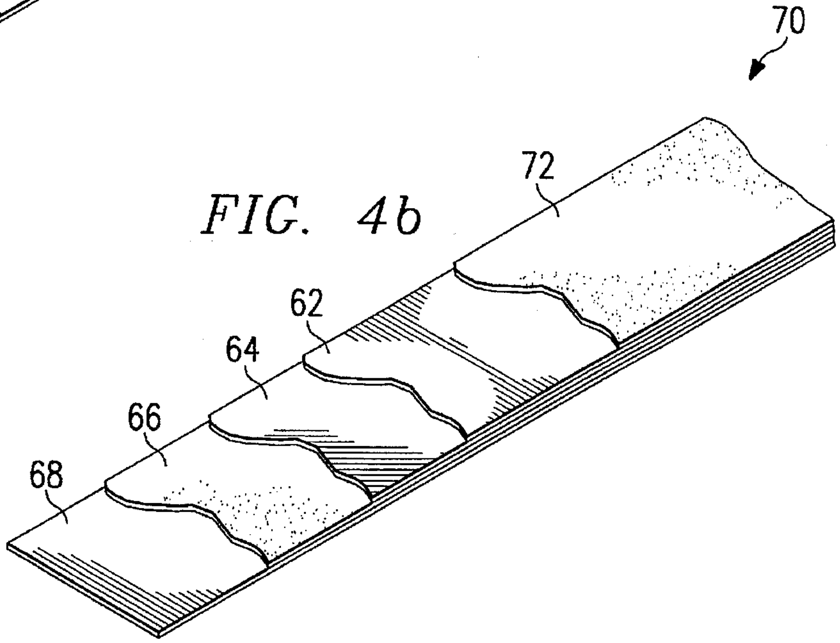

FIGS. 4*a*–4*b* illustrate various embodiments of the tape that the present embodiment uses. For example, referring to FIG. 4*a*, tape 60 includes plastic film 62 formed over a metallized layer 64. Metallized layer 64 of tape 60 is a layer of aluminum sputtered on a film such as polyamide or polyester. Metallized layer 64 attaches to adhesive layer 66. Removable liner 68 protects adhesive layer 66 until application. FIG. 4*b* shows a further embodiment of the absorptive tape 70 that adds to plastic film 62 a vulcanized rubber layer 72 that includes a radiofrequency absorbing filler. The adhesive layer 66, again, is on metallized layer 64 of tape 70.

Tape 60 has no radiofrequency absorbing coating. It has the use, therefore, as a cover for gaps and fasteners on top of which either compound 20 or a sprayed radiofrequency signal absorbing coating may be placed. For example, tape 60 may be placed on an uncoated outer skin to cover gaps and fasteners. Thereafter, a radiofrequency absorbing coating may be sprayed on the outer skin and tape 60. If maintenance or repair of the outer skin or component parts beneath the coating is necessary, tape 60 may be removed. Thereafter, either tape 60 or tape 70, which includes radiofrequency absorbing rubber layer 72, may be used to recover the gaps or fasteners. In either event, compound 20 may be used to recover all or part of the tape (i.e., all tape 60 or the edges of tape 70). The result will be a radiofrequency signal absorbing enclosure of the vehicle.

As with compound 20, tapes 60 and 70 satisfy the requirements of the following Military material requirements and ASTM test procedures.

| | |
|---|---|
| ASTM-D522-85 | Flexibility (Conical Mandrel Bend) |
| ASTM-D1000 | Standard Methods of Testing Adhesive-Coated Tapes Used for Electrical Insulation |
| ASTM-D1640 | Test Methods for Free Films of Coatings |
| ASTM-D2196 | Test Methods for Brookfield Viscosity |
| ASTM-2369 | Volatile Content of Coatings |
| ASTM-G-85-84 | Test Methods for Exposure to $SO_2$ Salt Fog |

These are incorporated by reference and how the present embodiment satisfies these is described in more detail below.

The absorptive tape of the present embodiment demonstrates a peel adhesion of 35 to 65 ounces per inch width minimum (i.e., 38 Newtons per 100 mm) when applied in accordance with the testing procedures of ASTM D1000 using a cross head travel speed of 12 inches per minute. The tensile strength of the film, for tape 60 is 20 lbs. and is tested in accordance with ASTM D1000 using a 2-inch initial draw separation and a cross head speed of 12 inches per minute. Tape 60, for example, has a tear strength of 10 lbs. Metallic layer 64 tape 60 and tape 70 has a surface resistivity of no more than 1 ohm per square. Metallized layer 64 may be an A286 stainless steel that is passivated per FPS-3007 with a prime coating having a dry film thickness of 0.4 to 1.5 mils.

Tape 60 and 70 do not demonstrate galvanic interaction with other construction materials after 500 hours, when exposed to salt fog pursuant to ASTM G85 Annex A4. Tape 60 also does not shrink or embrittle when exposed to temperatures ranging from 350° F. to −65° F. The tapes also demonstrate the same low temperature flexure properties as does compound 20. Moreover, thermal cycling from 250° F. to −65° F. at a ramp rate of 10° F. per minute, repeatedly will not adversely affect functioning of tapes 60 or 70. Furthermore, there is no separation of the coatings from the tape's surface and normal environmental conditions of the film. The tape is capable of being stored for one year from the date of receipt. Tape 70 of FIG. 4*b* exhibits similar performance and material characteristics. In the present embodiment, tape 60 of FIG. 4*a*, has a thickness of 0.003 inches and tape 70 of FIG. 4*b* has a thickness of 0.015 inches.

Figure 5:
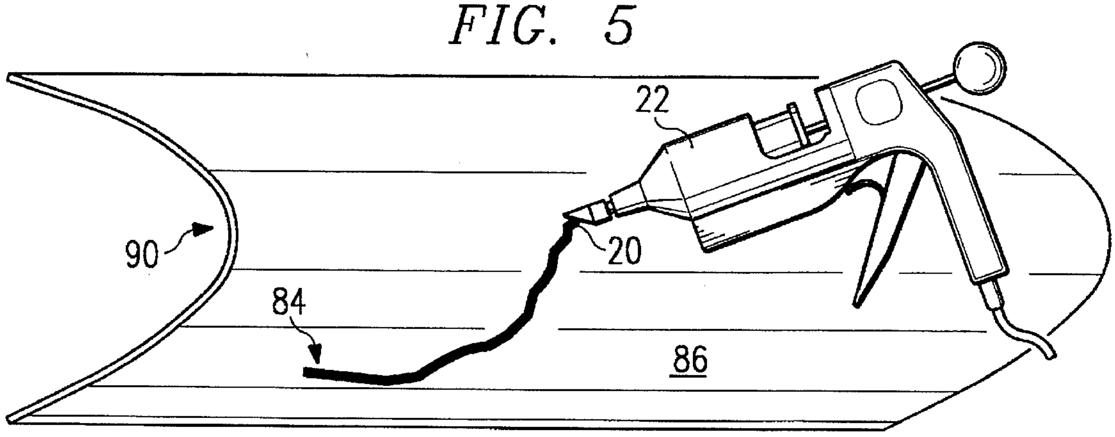
FIG. 5 conceptionally illustrates applying the heat-responsive compound of the present embodiment using the applicator of FIG. 2.

FIG. 5 illustrates the use of the repair kit of the present embodiment for repairing a radiofrequency signal absorbing surface. Thus, when compound 20 is in applicator 22, the heating element within cartridge 36 heats it to a molten form. The molten compound 20 flows through applicator tip 40 to be applied smoothly to exposed area 84 of coating 86. After application, compound 20 cools and forms a hard coating having the same radiofrequency signal absorbing properties of coating 86.

Figure 6:
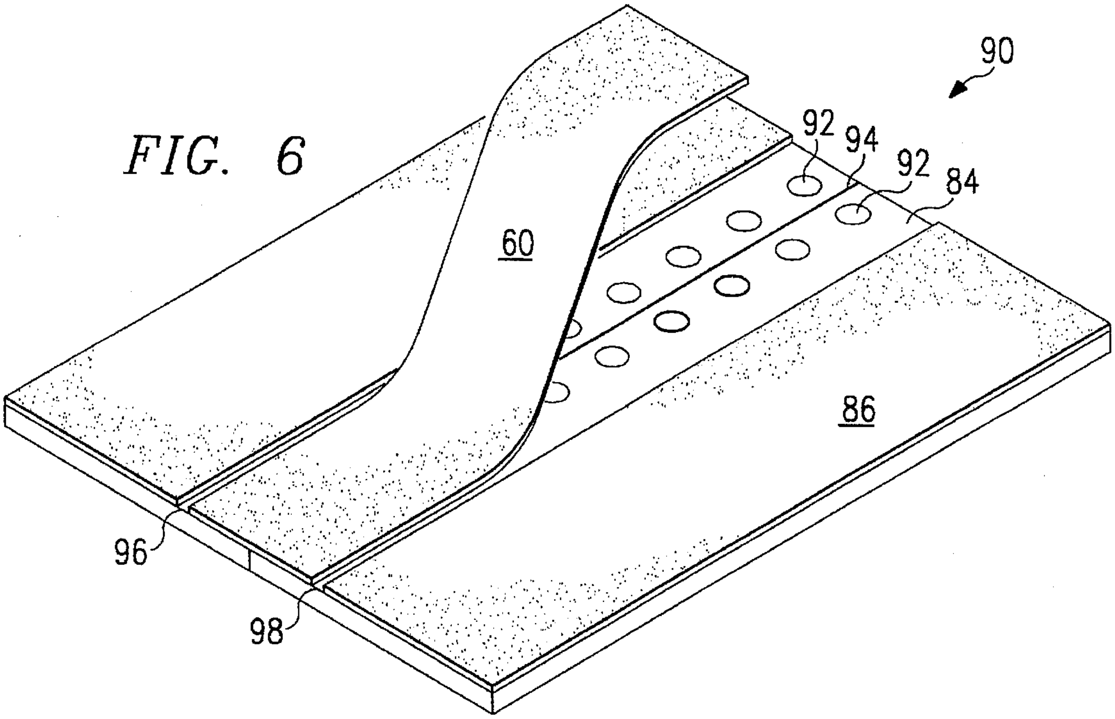
FIG. 6 illustrates applying the absorptive tape over a repaired aircraft structural surface.

FIG. 6 shows application of tape 60 over structure 90. Structure 90 includes coating 86 on all areas except for the partially exposed area 84. Partially exposed area 84 also includes fastener holes 92. To cover fastener holes 92, and gap 94, after applying tape 60, heat-responsive compound 20 may be applied within gaps 96 and 98 using applicator 22. Applicator tip 40 forms a smooth continuous radiofrequency signal absorptive repair of absorptive coating 86.

Figure 7:
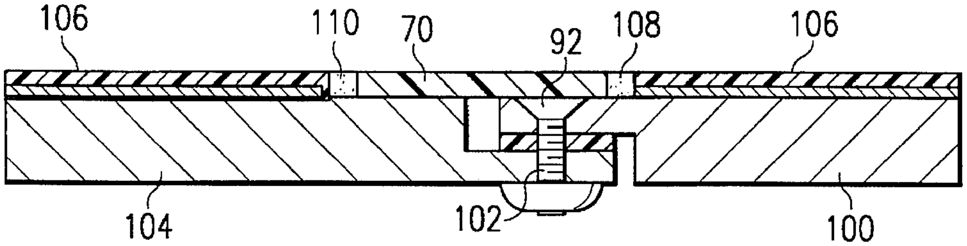
FIG. 7 provides a cross-sectional view of a surface repaired according to the method of the present embodiment.

FIG. 7 shows further the benefits of using the combination of radar absorptive tape 60 to cover the fastener openings 92. For example, suppose that a structure includes portion 100 that through fastener 102 attaches to portion 104. Portions 100 and 104 are covered by coating 106. At the juncture of portions 100 and 104, space 108 appears. Without some type of shield or coating space 108 would result in an exposed area of the surface. By applying tape 60 over fastener opening 92 and filling in gaps 108 and 110 with the viscous molten compound 20, a continuous seal over structure 100, fastener 92, and portion 104 results.

Figure 8A:
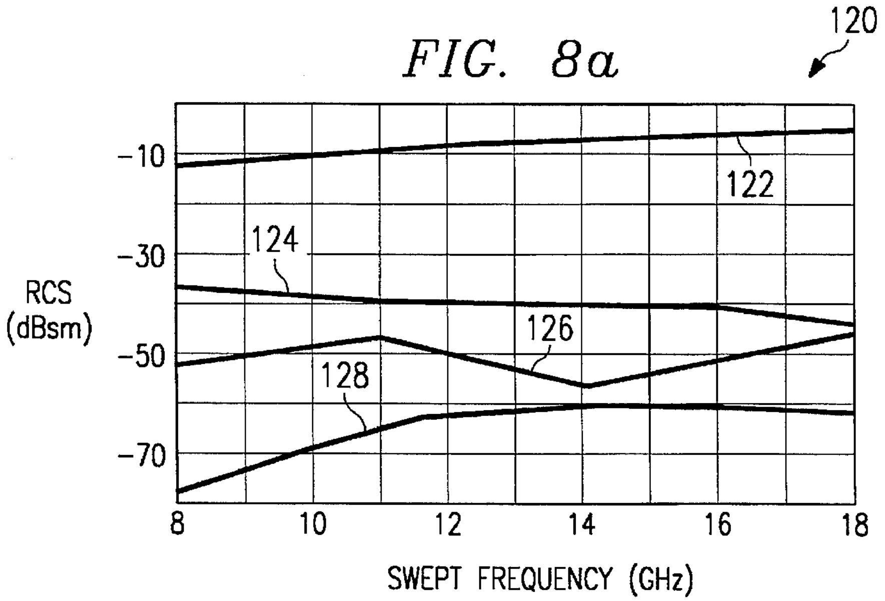
FIGS. 8*a* and 8*b* illustrate performance characteristics that the present embodiment provides.
Figure 8B:
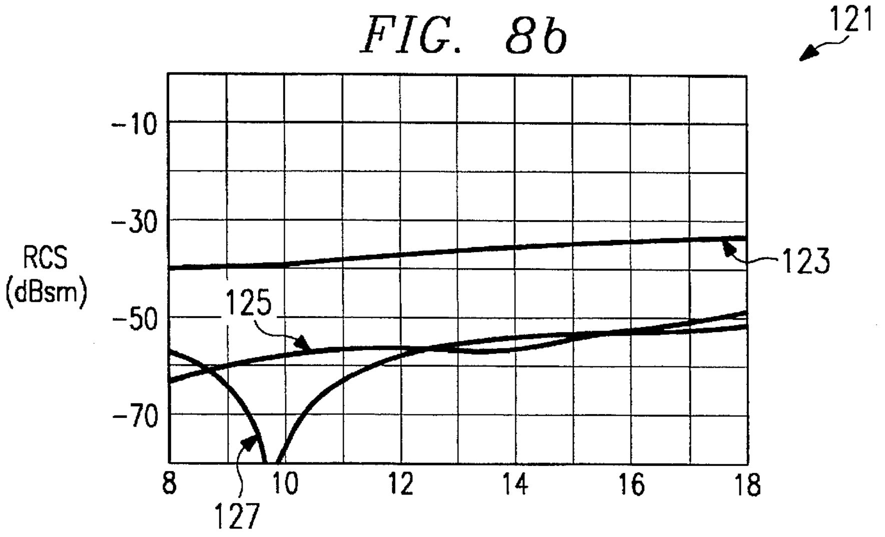

FIGS. 8*a* and 8*b,* show a chart that illustrates the gap filler treatment performance of the present embodiment. Along vertical axis of chart 120 in FIG. 8*a* appears a scale for radar cross section (RCS) measurements in dBsm ranging from −80 to +20 with the horizontal axis shown in gigahertz ranging from 8 to 18 Ghz. The specimen for chart 120 of FIG. 8*a* has a length of 12 inches with the width of 0.125 inches and depth of 0.125 inches. Line 122 shows the RCS performance of the associated structure having no heat-responsive compound applied to fill the gap. Line 124 shows the results of a "quick access gap." A quick access panel uses latches that determine the accessibility of the exposed area. In quick access panels, no rework is necessary to the overall paint scheme of the coating. Line 126 shows the results of an "access gap." The access gap uses a conventional access panel and fasteners that make use of compound 20 as the sealant alternative. For this type of panel, less than 15 minutes of rework is required. Line 128 illustrates the RCS performance of a "permanent gap" seal formed according to the present embodiment. The permanent panel is an infrequently used panel, but one for which the first entry results in a charge to the access scheme for the coating. The various RCS measurements show the relative effectiveness of the present embodiment in concealing the affected area from a radiofrequency detection sensor system.

FIG. 8*b* shows chart 121 of data from chamber tests that illustrate performance of the present embodiment in filling a gap of the same size as that in FIG. 8*a* and in the manner as shown in FIG. 5. In chart 121, which uses the same scale as chart 120 of FIG. 8*a,* open gap line 123 shows the measured results of testing the electromagnetic performance of an open gap such as exposed area 84. Line 125 shows the frequency performance of an epoxy in a gap such as exposed area 84. With compound 20 in the exposed area, the performance is that of line 127. As FIG. 8*b* clearly illustrates, compound 20 significantly improves the electromagnetic performance of the radiofrequency signal absorbing coating.

Figure 9:
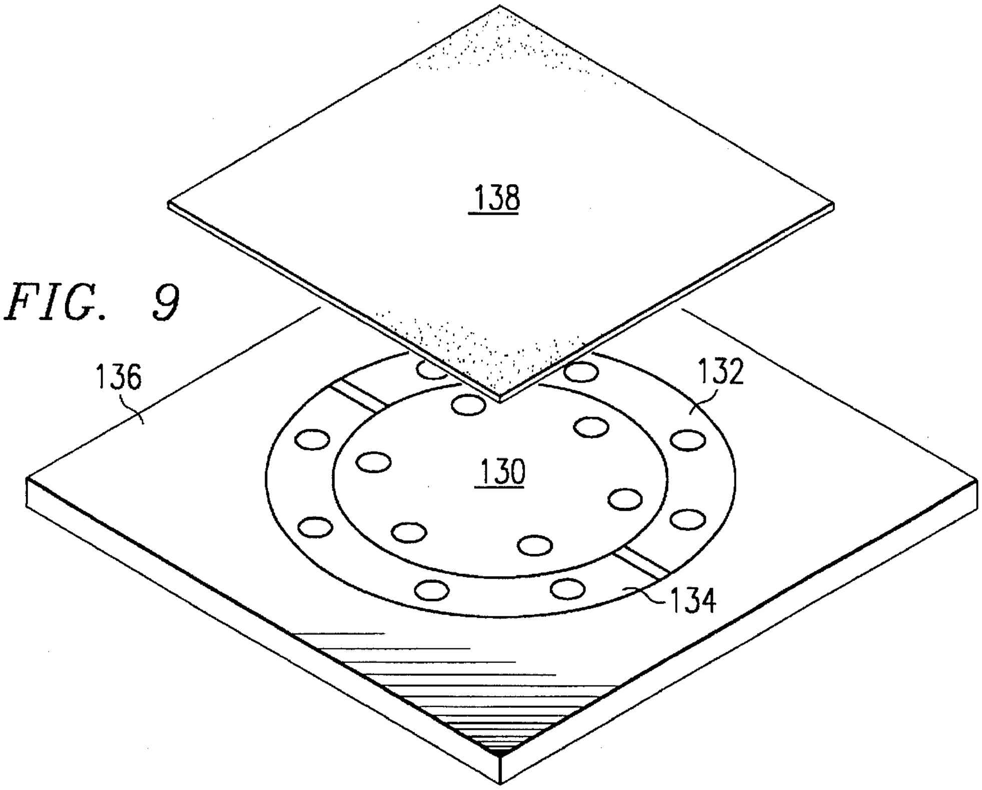
FIG. 9 illustrates an alternative embodiment of one aspect of the present invention.

Referring to FIG. 9, there appears a flush composite patch 130 that uses composite doublers 132 and 134 around flush composite patch 130 to fasten flush composite patch 130 to the associated structure 136. According to the present embodiment, absorptive tape 70, for example, may form patch 138 to adhere to the flush composite patch 130 and composite doublers 132 and 134. Then, the heat-responsive compound may be used to seal all corners of patch 138 to provide a continuous coating over the structure 136.

Figure 10:
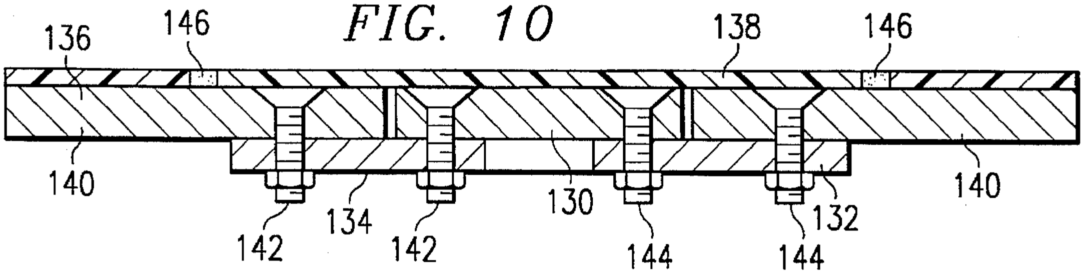
FIG. 10 provides a cross-sectional view of a surface sealed according to the alternative embodiment of FIG. 9.

FIG. 10 shows a cut-away sideview of the seal that FIG. 9 represents. In particular, on skin or structure 140 a repair in the form of a skin patch 130 is installed. Composite doublers 132 and 134 holds skin patch 130 in place. Composite doublers 132 and 134 include fasteners 142 for composite doubler 132 and composite doubler 134. Adhesive patch 138, therefore, covers composite doublers 132 and 134 and their associated fasteners. This, however, produces gap 146 in the coating. Gap 146 is easily filled with compound 20 to make a continuous radiofrequency signal absorptive coating that is continuous and smooth with coating 86.

OPERATION

Although the operation of the present embodiment is inherent from the above description, for completeness the following describes use of the method and repair kit for repairing radiofrequency signal absorbing coating of the present invention. In general, there are two reasons to require repair of a radiofrequency signal absorbing coating. The first arises in the event of damage to the coating or the underlying structure. The second reason occurs when scheduled or unscheduled maintenance or repair becomes necessary and the maintenance that requires breaching the radiofrequency absorbing coating. To make the repair, it is necessary to have access to the affected area. The affected area may be the coating itself or may be an underlying structure. In the event of an underlying structure, often an access panel must be removed. Where there is an access panel, the procedure is to remove the coating or to remove any existing tape such as tape 60 or tape 70 and any filler compound such as compound 20. For access to the area covered by the access panel, it is necessary to remove the fasteners of the panel. The next step is to perform the maintenance or repair of the equipment beneath the access panel. Then, following the repair or maintenance, use of the present embodiment includes reapplying the panel and the fastener. Then, the next steps are to apply new tape or patch to cover the access panels gaps or openings and then seal the gaps between the patch or tape 70 and the associated radiofrequency signal absorbing coating with a smooth bead of compound 20. Thereafter, a top coating or finish may be applied to match the associated top coat of the radiofrequency signal absorbing coating.

In the event of damage to the radiofrequency signal absorbing coating, the present embodiment accommodates repair by the steps of removing the coating that is damaged to a degree appropriate for the size of the damage. The next step is to replace the damaged coating and structure if an underlying structure is damaged, then to apply the tape or a patch to a size commensurate with the degree of damage. Next, the present embodiment is used to seal the patch edges with a smooth bead of compound 20 that makes a continuous surface from the tape or patch to the associated radiofrequency signal absorbing coating.

The methods and materials of the present embodiment are practically and effectively in place for larger scale manufacturing of the product and provide a material repair kit that in its final form offers a cure time of less than one minute. Compound 20 can produced in useful quantities tailored to match the variety of materials that require repair and rework. A technical advantage of the present invention, therefore, is that the heat-responsive compound 20 achieves an essentially instant cure of the repair coating. In one embodiment, the compound 20 cures by reducing below the selected temperature in a time less than approximately one minute in normal environmental conditions.

Another technical advantage of the present invention is that the applicator device allows material to be placed in gaps or recesses in an absorptive surface without expensive secondary finishing of the reworked and repaired area. A further technical advantage of the present invention is that the absorptive tape provides a means for hiding gaps and fasteners to maintain the integrity of the radiofrequency signal absorptive coating. By sealing the edges of the tape with heat-responsive compound 20, a continuous seal results that provides a desirable degree of radiofrequency signal absorption.

In summary, the present embodiment provides a repair kit for sealing an exposed area of a radiofrequency coating with a radiofrequency signal absorptive coating. The repair kit includes a heat responsive compound having the property of transforming from a solid state to a viscous melted state at temperatures above a selected temperature. The heat-responsive compound returns to a solid state after cooling to temperatures below the selected temperature. The heat-responsive compound includes a radiofrequency absorbing material that absorbs radiofrequency signals at approximately equal frequency to those of the radiofrequency signal absorptive coating. An applicator applies the heat-responsive compound in the viscous melted state to cover the exposed area. An absorptive tape or film then conceals any gap or fasteners associated with the exposed area. The absorptive tape has the ability to absorb radiofrequency signals of approximately equal frequency to those of the radiofrequency signal absorptive coating.

Although the present invention has been described in detail, it should be understood that various changes, substitutions and alterations can be made hereto without departing from the spirit and scope of the invention as defined by the appended claims.

What is claimed is:

1. A repair kit for sealing an exposed area of a surface coated with a selected radiofrequency signal absorbing coating, comprising:

a heat-responsive compound having a property of transforming from a solid state to viscous melted state at temperatures above a selected temperature and returning to a solid state after cooling to temperatures below said selected temperature, said heat-responsive compound comprising a metallic filler material selected to associate with the selected radiofrequency signal absorbing coating;

an applicator device for applying said heat-responsive compound in said viscous melted state for covering exposed area; and a tape for concealing any gap or fastener associated with said exposed area said heat-responsive compound further for covering a portion of said tape to make a smooth surface between said tape and said selected radiofrequency signal absorbing coating.

2. The kit of claim 1, wherein said heat-responsive compound comprises a filler material comprising a carbonyl iron powder filler suspended in a thermoplastic resin.

3. The kit of claim 2, wherein said heat-responsive compound possesses a specific gravity of between 3.6 and 3.8 in said solid state.

4. The kit of claim 2, wherein said heat-responsive compound possesses a storage life of not less than 1 year.

5. The kit of claim 2, wherein said heat-responsive compound adheres to an epoxy polyamide primer coating.

6. The kit of claim 2, wherein said heat-responsive compound possesses a vicat softening temperature of not less than 350° F.

7. The kit of claim 1, wherein said heat-responsive compound maintains a constant chemical composition in said solid state and in said viscous melted state, thereby providing a stable, non-toxic covering of said exposed area.

8. The kit of claim 1, wherein said tape comprises a plastic film layer, a metallized layer, and an adhesive layer.

9. The kit of claim 1, wherein said applicator further comprises an applicator device tip for smoothly applying said heat-responsive compound over the exposed area.

10. The kit of claim 9, wherein said applicator tip comprises a straight elongated edge for smoothing said heat-responsive compound over the exposed area and said radiofrequency signal absorbing coating.

11. A method for using a kit comprising a heat-responsive compound for sealing an exposed area of a surface primarily coated with a radiofrequency signal absorptive coating, comprising:

transforming a heat-responsive compound from a solid state to viscous melted state at temperatures above a selected temperature and returning to a solid state after cooling to temperatures below said selected temperature, said heat-responsive compound comprising a metallic filler material selected to associate with selected radiofrequency signal absorbing coating;

applying the heat-responsive compound in the viscous melted state to cover the exposed area; and concealing any gap or fastener associated with said exposed area with a tape; and covering a portion of said tape with the heat-responsive compound to make a smooth surface between said tape and said selected radiofrequency signal absorbing coating.

12. The method of claim 11, further comprising the step of forming said heat-responsive compound from a metallic filler material from a carbonyl iron powder filler suspended in a thermoplastic resin using a filler material within the heat-responsive compound.

13. The method of claim 12, further comprising the step of using a heat-responsive compound possessing a specific gravity of between 3.6 and 3.8 in said solid state.

14. The method of claim 12, further comprising the step of using a heat-responsive compound possessing a storage life of not less than 1 year.

15. The method of claim 12, further comprising the step of heat-responsive compound adhering to an epoxy polyamide primer coating.

16. The method of claim 11, further comprising the step of using a heat-responsive compound a constant chemical composition in both the solid state and in the viscous melted state, to provide a stable, non-toxic covering of the exposed area.

17. The method of claim 11 further comprising the step of using a tape comprising a radiofrequency signal absorbing layer for absorbing radiofrequency signals having approximately equal frequencies to those that the radiofrequency signal absorbing coating absorbs after application of the heat-responsive compound.

18. The method of claim 11, further comprising the step of smoothly applying the heat-responsive compound over the exposed area using an applicator tip attached to the applicator device while the heat-responsive compound is in a viscous melted state.

19. The method of claim 11, further comprising the step of smoothing the heat-responsive compound over the exposed area using an elongated edge of the applicator tip while the heat-responsive compound is in a viscous melted state.

20. A method for forming a repair kit for sealing an exposed area of a surface primarily coated with a selected radiofrequency signal absorptive coating, comprising:

forming a heat-responsive compound having a property of transforming from a solid state to viscous melted state at temperatures above a selected temperature and returning to said solid state after cooling to temperatures below said selected temperature, said heat-responsive compound comprising a metallic filler material for associating with the selected radiofrequency signal absorbing coating;

associating an applicator device with the heat-responsive compound for applying said heat-responsive compound in the viscous melted state for covering exposed area; and forming a tape for concealing any gap or fastener associated with said exposed area; and further forming the heat-responsive compound further to cover a portion of the tape to make a smooth surface between the tape and the selected radiofrequency signal absorbing coating.

* * * * *